(12) United States Patent
Makki et al.

(10) Patent No.: US 12,375,207 B2
(45) Date of Patent: Jul. 29, 2025

(54) HANDLING OF RE-TRANSMISSIONS IN A WIRELESS COMMUNICATION NETWORK

(71) Applicant: Telefonaktiebolaget LM Ericsson (publ), Stockholm (SE)

(72) Inventors: Behrooz Makki, Pixbo (SE); Mikael Coldrey, Borås (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 462 days.

(21) Appl. No.: 17/774,682

(22) PCT Filed: Nov. 6, 2019

(86) PCT No.: PCT/SE2019/051117
§ 371 (c)(1),
(2) Date: May 5, 2022

(87) PCT Pub. No.: WO2021/091440
PCT Pub. Date: May 14, 2021

(65) Prior Publication Data
US 2022/0376828 A1 Nov. 24, 2022

(51) Int. Cl.
*H04L 1/08* (2006.01)

(52) U.S. Cl.
CPC .................... *H04L 1/08* (2013.01)

(58) Field of Classification Search
None
See application file for complete search history.

(56) References Cited

U.S. PATENT DOCUMENTS

| | | | |
|---|---|---|---|
| 8,923,208 B2 * | 12/2014 | Dayal | H04W 72/1215 370/328 |
| 2008/0318519 A1 * | 12/2008 | Iwasaki | H04B 7/2606 455/7 |

(Continued)

FOREIGN PATENT DOCUMENTS

| CN | 101335563 A | 12/2008 |
|---|---|---|
| CN | 107205267 A | 9/2017 |

(Continued)

OTHER PUBLICATIONS

International Search Report and the Written Opinion of the International Searching Authority, issued in corresponding International Application No. PCT/SE2019/051117, dated Jun. 23, 2020, 13 pages.

(Continued)

*Primary Examiner* — Steve R Young
(74) *Attorney, Agent, or Firm* — Rothwell, Figg, Ernst & Manbeck, P.C.

(57) ABSTRACT

The present disclosure relates to a node (AP2, U11) in a wireless communication system (1), where the node (AP2, U11) is adapted to communicate with at least two other nodes (AP1, AP0) in the wireless communication system (1), and where the other nodes (AP1, AP0) are first type nodes (AP1, AP0) which are adapted to communicate with each other by means of backhaul communication. The node (AP2, U11) is adapted to receive a signal (xA) transmitted from an adjacent first type node (AP1), where the (xA) has been forwarded from at least one farther first type node (AP0). In case of unsuccessful decoding of the signal (xA), (Continued)

the node (AP2, U11) is adapted to request re-transmission (NACK) of the signal (xA), and to receive a re-transmission of the signal (xA) directly from a farther first type node (AP0).

11 Claims, 9 Drawing Sheets

(56) References Cited

U.S. PATENT DOCUMENTS

| | | |
|---|---|---|
| 2009/0232044 A1 | 9/2009 | Chang et al. |
| 2009/0264123 A1 | 10/2009 | Asgashe et al. |
| 2010/0246477 A1* | 9/2010 | Hasegawa ............ H04L 1/0015 370/315 |
| 2013/0194994 A1 | 8/2013 | Dayal et al. |
| 2014/0289581 A1* | 9/2014 | Maret .................. H04L 1/20 714/751 |
| 2019/0028232 A1* | 1/2019 | Kalhan ................ H04L 1/1825 |
| 2019/0132778 A1* | 5/2019 | Park ..................... H04W 16/28 |
| 2020/0100255 A1* | 3/2020 | Wu ...................... H04W 4/023 |
| 2020/0145176 A1 | 5/2020 | Hencinski et al. |
| 2020/0146099 A1* | 5/2020 | Abedini ............... H04W 80/02 |

FOREIGN PATENT DOCUMENTS

| | | |
|---|---|---|
| WO | 2019/001695 A1 | 1/2019 |
| WO | 2019197663 A1 | 10/2019 |
| WO | 2020182268 A1 | 9/2020 |
| WO | 2020182274 A1 | 9/2020 |

OTHER PUBLICATIONS

Ericsson "Deployment scenarios and use cases for Integrated Access Backhaul" 3GPP TSG-RAN WG2 NR AH1801, Vancouver, CA, Jan. 22-Jan. 26, 2018, R2-1801021, 6 pages.
AT&T "End-to-end vs. hop-by-hop RLC ARQ design for L2 relaying in IAB" 3GPP TSG-RAN WG2 #102, Busan, Korea, May 21-25, 2018, R2-1808758, 8 pages.
Qualcomm et al. "Proposals on IAB Architecture" 3GPP TSG-RAN WG2 NR Ad hoc 1801, R2-1801606 Vancouver, Canada, Jan. 22-Jan. 26, 2018, 7 pages.
Intel Corporation "Scenario and architecture for IAB" 3GPP TSG RAN WG2 Meeting #AH 1801, Vancouver, Canada, Jan. 22-Jan. 26, 2018, R2-1800953, 8 pages.
Qualcomm Inc et al. "Way Forward—IAB Architecture for L2/3 relaying" 3GPP TSG-RAN WG3 Meeting #99, 3GPP TSG-RAN WG3 Meeting #99, R3-181502, 6 pages.

* cited by examiner

HANDLING OF RE-TRANSMISSIONS IN A WIRELESS COMMUNICATION NETWORK

CROSS REFERENCE TO RELATED APPLICATION(S)

This application is a 35 U.S.C. § 371 National Phase Entry Application from PCT/SE2019/051117, filed Nov. 6, 2019, designating the United States, the disclosure of which is incorporated herein by reference in its entirety.

TECHNICAL FIELD

The present disclosure relates to relaying in wireless communication networks, in particular in integrated access and backhaul (IAB) networks.

BACKGROUND

The fifth generation of wireless networks (5G) must provide high-rate data streams for everyone everywhere at any time. To meet such demands, it is required to use large bandwidths. Here, it is mainly concentrated on millimeter wave-based, potentially, massive multiple-input and multiple-output (MMIMO), links as a key enabler to obtain sufficiently large bandwidths/data rates. Importantly, the presence of very wide bandwidths makes it possible to include the wireless backhaul transport in the same spectrum as the wireless access. In such a setup, there is thus a sharing of radio resources between access and backhaul links which implies that access and backhaul links compete over the same radio resources pool.

For this reason, 3GPP has considered such integrated access and backhaul (IAB) network configurations where an access point (AP), that for example can be fiber-connected, provides other APs as well as the customer-premises equipments (CPE:s) inside its cell area with wireless backhaul and access connections, respectively. The access-integrated backhaul link can either be a single-hop or multi-hop link in an IAB network. In a multi-hop deployment, the IAB network from one AP is relayed along a certain route from AP to AP until it reaches its destination. IAB networks can thus have either star-like configuration with multiple APs wirelessly backhauled through direct single-hop connections to the fiber-connected AP, or a cascade configuration with APs wirelessly connected to the fiber-connected AP in a multi-hop fashion.

It is desired to densify the network with a large number of access points (AP:s), each one serving a number of CPE:s inside its corresponding relatively small cell area. Compared to the cases with few macro base stations covering a wide area, less path loss/shadowing, and higher Line Of Sight (LOS) connection probability are expected in dense small-cell networks. As a result, better channel quality is experienced in these short-range links, compared to the cases with few macro base stations.

Among the advantageous of IAB networks are the followings:
Cost Reduction:
A fiber optic link is relatively expensive in metropolitan areas, with a majority of the total figure tied to trenching and installation. For this reason, as well as the traffic jams and infrastructure displacements, some cities have considered a moratorium on fiber trenching specially in historical areas. In such scenarios, millimeter wave-based wireless backhaul is the best alternative providing almost the same rate as fiber optic with significantly less price and no digging.

Link Quality Enhancement:
Compared to the direct macro base station (BS)-CPE link, less path loss/shadowing, and higher line-of-sight (LOS) connection probability are expected for the wirelessly backhauled AP-CPE connections within small cells. As a result, better channel quality is experienced in such small cells, compared to the cases with direct macro BS-CPE connection.

Long-Term Network Planning:
IAB systems are of most interest in small cell backhaul and fixed wireless access (FWA) networks with stationary APs/CPEs. This makes it possible to predict the channel quality and perform accurate network planning for multiple packet transmissions.

In a multi-hop IAB network, the backhaul links are the bottleneck of the transmission setup. As an example, the IAB node directly connected to the fiber-connected IAB donor node is the most loaded node of the network which needs to transmit/receive messages of its associated CPEs as well as all other IAB nodes. This leads to high end-to-end and scheduling delay for the last hops of the network. The problem becomes emphasized in the cases with failed message transmission in the heavily-loaded nodes, as the spectrum is used for re-transmissions such as multiple hybrid automatic repeat (HARQ)-based retransmissions. This is specially because the IAB networks are mostly designed for, e.g., fixed wireless access (FWA) networks, with stationary nodes which suffer from low network diversity and require many retransmissions in case a message transmission fails.

For these reasons and to support a large number of hops and/or CPEs-per-hop, it is desired to have smart data transmission schemes such that not only the load of the highly-loaded IAB nodes is reduced but also the spectrum underutilization of the other nodes is avoided and the network diversity increases.

SUMMARY

It is an object of the present disclosure to provide a node in a wireless communication system which communicate with at least one other node, where it is desired that the load of highly-loaded nodes is reduced, and that spectrum under-utilization of the other nodes is avoided.

This object is obtained by means of a node in a wireless communication system, wherein the node is adapted to communicate with at least two other nodes in the wireless communication system, where the other nodes are first type nodes which are adapted to communicate with each other by means of backhaul communication. The node is further adapted to receive a signal transmitted from an adjacent first type node, where the signal has been forwarded from at least one farther first type node. In case of unsuccessful decoding of the signal, the node is adapted to request re-transmission (NACK) of the signal, and to receive a re-transmission of the signal directly from a farther first type node.

In this way, the load and buffer requirement of the adjacent first type node is reduced, and consequently the scheduling delay is reduced as well because part of the data is transferred without using the adjacent first type node. Re-transmission is performed without any system cost in terms of spectrum and scheduling delay, where network diversity is increased and, consequently, the probability of requiring multiple retransmission rounds is reduced.

According to some aspects, the node is adapted to send a request for re-transmission of the signal directly to a farther first type node.

In this way, the adjacent first type node is not involved in handling the signal after the initial transmission to the node.

According to some aspects, the node is a first type node that is adapted to communicate with the adjacent first type node over a corresponding backhaul channel, and to communicate with said farther first type node via a direct backhaul channel.

This means that the present disclosure is applicable for backhaul communication between access points. Using a direct backhaul channel alleviates all burden from the adjacent first type node after the initial transmission to the node.

According to some aspects, the farther first type node is a first type node that is connected to a core network by means of a fiber connection.

According to some aspects, the node is a second type node that is adapted to communicate with the adjacent first type node over a corresponding access channel, and to communicate with said farther first type node via a via a direct access channel.

This means that a second type node such as a CPE initially can communicate with an adjacent first type node such as an access point, and receive possible retransmissions directly from a farther first type node. Using a direct access channel between the second type node and the farther first type node alleviates all burden from the adjacent first type node after the initial transmission to the node.

According to some aspects, the communication between the first type nodes is a backhaul communication via at least one corresponding backhaul channel, and where at least one first type node is adapted to communicate with a corresponding group of second type nodes via a corresponding access channel. Each group of second type nodes comprises at least one second type node, where the backhaul communication and the access communication both are performed by means of common equipment at each one of the first type nodes.

This means that the present disclosure is applicable for backhaul communication between access points and CPE:s in an IAB network.

According to some aspects, a re-transmission of the signal are issued in temporarily inactive time periods where the node and the farther node are not engaged in any communication with other nodes.

This leads to lower end-to-end transmission delay, reduced buffer requirement and higher throughput for the second type nodes that are served by the node According to some aspects, the request for re-transmission (NACK) of the signal is based on Hybrid Automatic Repeat Request (HARQ).

This object is also obtained by means of a first type node in a wireless communication system, where the first type node is adapted to communicate with at least two other nodes in the wireless communication system. At least one of the other nodes is a first type node that is adapted to communicate with other first type nodes by means of backhaul communication. The node is further adapted to receive a signal transmitted from an adjacent first type node, and to forward the signal to a receiving node. The first type node is adapted to delete the forwarded signal from its buffer after having forwarded the signal, irrespective of if the receiving node is able to decode the signal or not.

In this way, the load and buffer requirement of the first type node is reduced, and consequently the scheduling delay is reduced as well because part of the data is transferred without involving the first type node. Re-transmission is performed without any system cost in terms of spectrum and scheduling delay, where network diversity is also increased and, consequently, the probability of requiring multiple retransmission rounds is reduced.

According to some aspects, the adjacent first type node is connected to a core network by means of a fiber connection.

This object is also obtained by means of methods and a communication system that are associated with the above advantages.

BRIEF DESCRIPTION OF THE DRAWINGS

The present disclosure will now be described more in detail with reference to the appended drawings, where.

DETAILED DESCRIPTION

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

Network densification takes advantage of wireless backhaul; due to a relatively high installation cost of fiber links, as well as traffic jams and infrastructure displacements, the relatively small application points (APs) need to be supported by high-rate LOS wireless backhaul links which motivates so-called integrated access and backhaul (IAB) networks.

Figure 1:
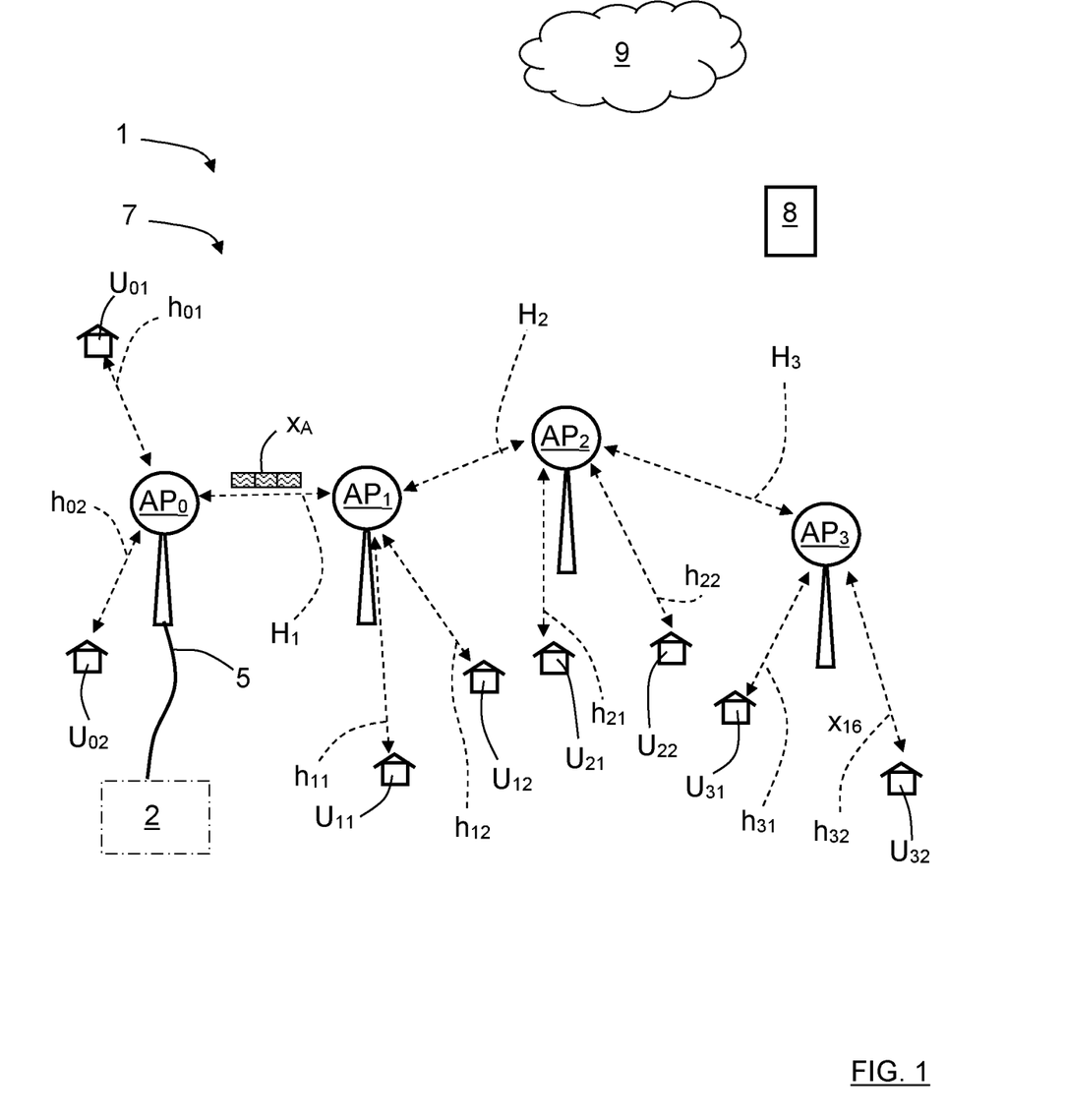
FIG. 1 schematically shows a view of a wireless communication system according to a first example at a first time.

With reference to FIG. 1, there is a wireless communication system 1 comprising an IAB network 7 with four hops. There are first type nodes $AP_0$, $AP_1$, $AP_2$, $AP_3$ in the wireless communication system 1, here in the form of a first access point $AP_0$, a second access point $AP_1$ a third access point $AP_2$ and a fourth access point $AP_3$. The access points $AP_0$, $AP_1$, $AP_2$, $AP_3$ are arranged for communication with each other in the wireless communication system 1 over a corresponding first backhaul channel $H_1$, second backhaul channel $H_2$, and third backhaul channel $H_3$ having a certain channel quality, generally by means of one of at least one type of signal relaying that according to some aspects employs decoding and encoding. According to some aspects, the signal relaying is constituted by decoding-encoding forward, DF, relaying of a signal.

Each access point $AP_0$, $AP_1$, $AP_2$ $AP_3$ is adapted for access communication with a corresponding group of second type nodes $U_{01}$, $U_{02}$; $U_{11}$, $U_{12}$; $U_{21}$, $U_{22}$; $U_{31}$, $U_{32}$ via a corresponding access channel $h_{01}$, $h_{02}$; $h_{11}$, $h_{12}$; $h_{21}$, $h_{22}$; $h_{31}$, $h_{32}$, providing wireless access. The second type nodes $U_{01}$, $U_{02}$; $U_{11}$, $U_{12}$; $U_{21}$, $U_{22}$; $U_{31}$, $U_{32}$ are here in the form of customer-premises equipments (CPE:s), and generally each group of CPE:s $U_{01}$, $U_{02}$; $U_{11}$, $U_{12}$; $U_{21}$, $U_{22}$; $U_{31}$, $U_{32}$ comprises at least one CPE. The number of CPE:s for each access point $AP_0$, $AP_1$, $AP_2$ $AP_3$ in FIG. 1 is only an example; there can be any number of CPE:s for each access point $AP_0$, $AP_1$, $AP_2$ $AP_3$. One or more access points can according to some aspects lack CPE:s to serve, only serving as relaying nodes. Generally, a network with N access points and m CPE:s per access point. Also, the CPE:s served by $AP_1$ are generally denoted by $U_{ij}$, j=1, . . . , m.

The backhaul communication and the access communication are according to some aspects both performed by means of common equipment at the access points $AP_0$, $AP_1$, $AP_2$ $AP_3$. The second access point $AP_1$, the third access point $AP_2$ and the fourth access point $AP_3$ are wirelessly backhauled by the first access point $AP_0$ connecting to a core network 2 using a fiber connection 5. An access point $AP_0$ connected to a core network can be referred to as an IAB donor node.

In IAB networks, uplink (UL) and downlink (DL) transmission do not follow the common definition, as both endpoints of the backhaul links are access points. However, for simplicity, we refer to data transmission towards (resp. from) the first access point $AP_0$ as UL (resp. DL) transmission. The present disclosure is applicable for DL transmission from the first access point $AP_0$ to the other nodes.

Figure 2:
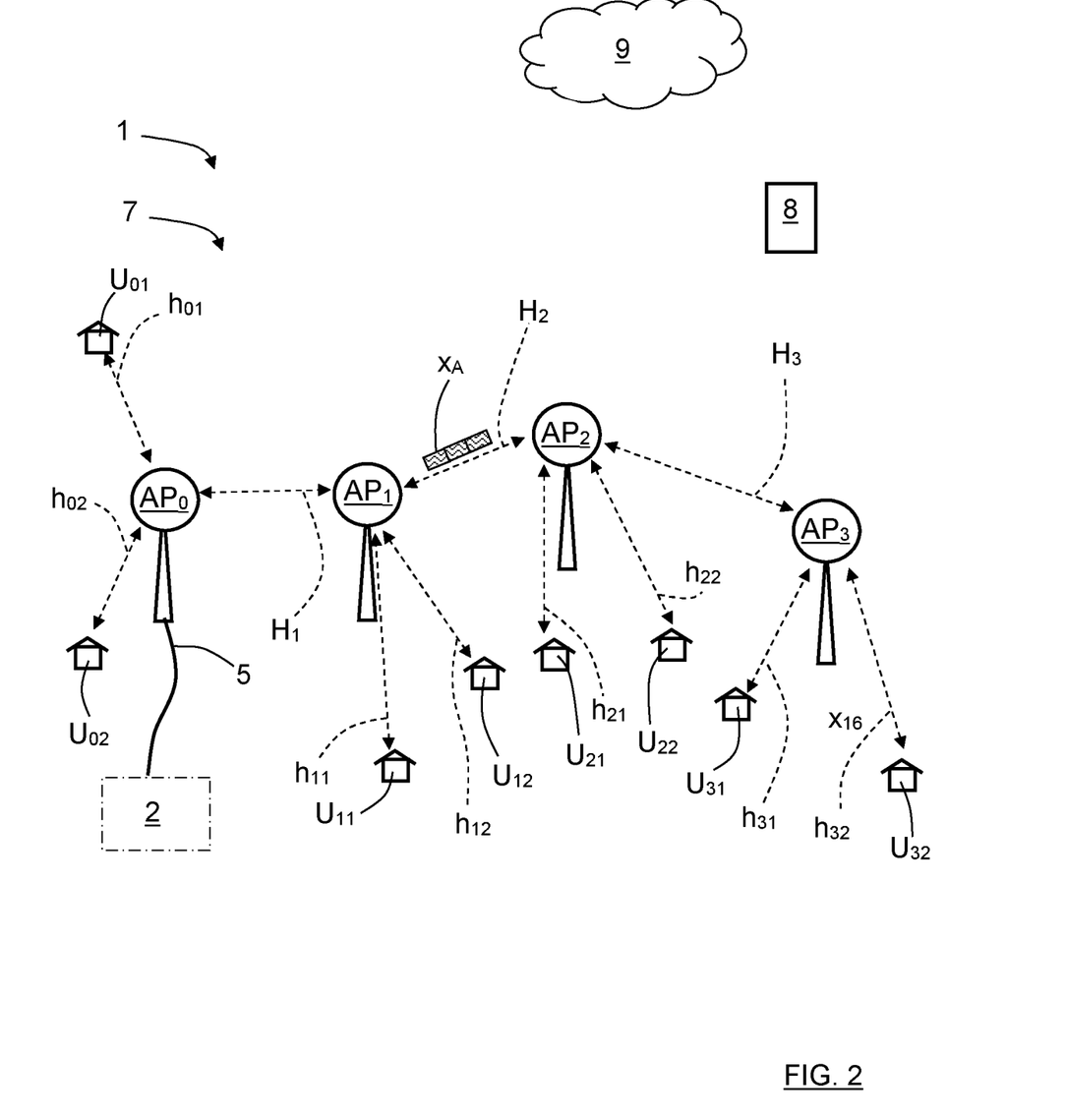
FIG. 2 schematically shows a view of a wireless communication system according to the first example at a second time.

Different scheduling protocols can be considered, and in the following example a time slot 6, as illustrated in FIG. 2, is divided into receive (Rx) and transmit (Tx) sub-slots $RX_s$, $TX_s$ for the first access point $AP_0$, and in each one there is both backhaul and access connections. this means that the discussions relate to both UL transmission from the CPE:s $U_{01}$, $U_{02}$; $U_{11}$, $U_{12}$; $U_{21}$, $U_{22}$; $U_{31}$, $U_{32}$ to the first access point $AP_0$. and DL transmission from the first access point $AP_0$ to the CPE:s $U_{01}$, $U_{02}$; $U_{11}$, $U_{12}$; $U_{21}$, $U_{22}$; $U_{31}$, $U_{32}$. Also, the setup is discussed for time-division multiple access (TDMA) setup. However, the same scheme can also be adapted for other resource allocation approaches such as for example frequency-division multiple access (FDMA).

As the number of hops/CPEs per hop increases, the AP:s need to transfer an aggregated data of multiple CPE:s accumulated from the previous hops. As a result, the AP-AP backhaul links are heavily loaded, which may lead to high decoding complexity/delay and buffering cost for the AP:s as well as large end-to-end transmission delay/low end-to-end throughput for the CPE:s. This becomes more and more pronounced the closer an AP is to an access point $AP_0$ that is connected to a core network 2.

More in detail, in a general case with m CPE:s per access point, which can be applied to the present example, for each time slot, the first access point $AP_0$ needs to send 2 Nm signals for both its m CPEs, m DL and m UL signals, in access and the DL/UL backhaul signals for (N−1)m CPEs of the other access points $AP_1$, $AP_2$, $AP_3$. Then, access point i>0 needs to transfer 2(2 Nm−im) signals in total, both access and backhaul, DL and UL. As a result, the second access point, $AP_1$ is the busiest node being active during the whole time slot, while the other access points $AP_2$, $AP_3$ may be off in some periods and wait for the previous hops to finish their data transmission.

This is because:
Part of the spectrum is underutilized because different access points need to wait until the data transmission of the more loaded access points are finished, and
The high load of the second access point $AP_1$ and other highly loaded nodes leads to large scheduling delay for all CPE:s.

The problem becomes more important if the data transmission in the link between the second access point $AP_1$ and the third access point $AP_2$ via the second backhaul channel $H_2$ fails. This is because IAB networks are mostly designed for, e.g., fixed wireless access (FWA) networks, with stationary CPE:s for which the network diversity is low. Thus, with high probability, multiple retransmissions based on HARQ (Hybrid Automatic Repeat Request) may be needed, which results in even higher scheduling delay and buffer requirement of the second access point $AP_1$.

Figure 3:
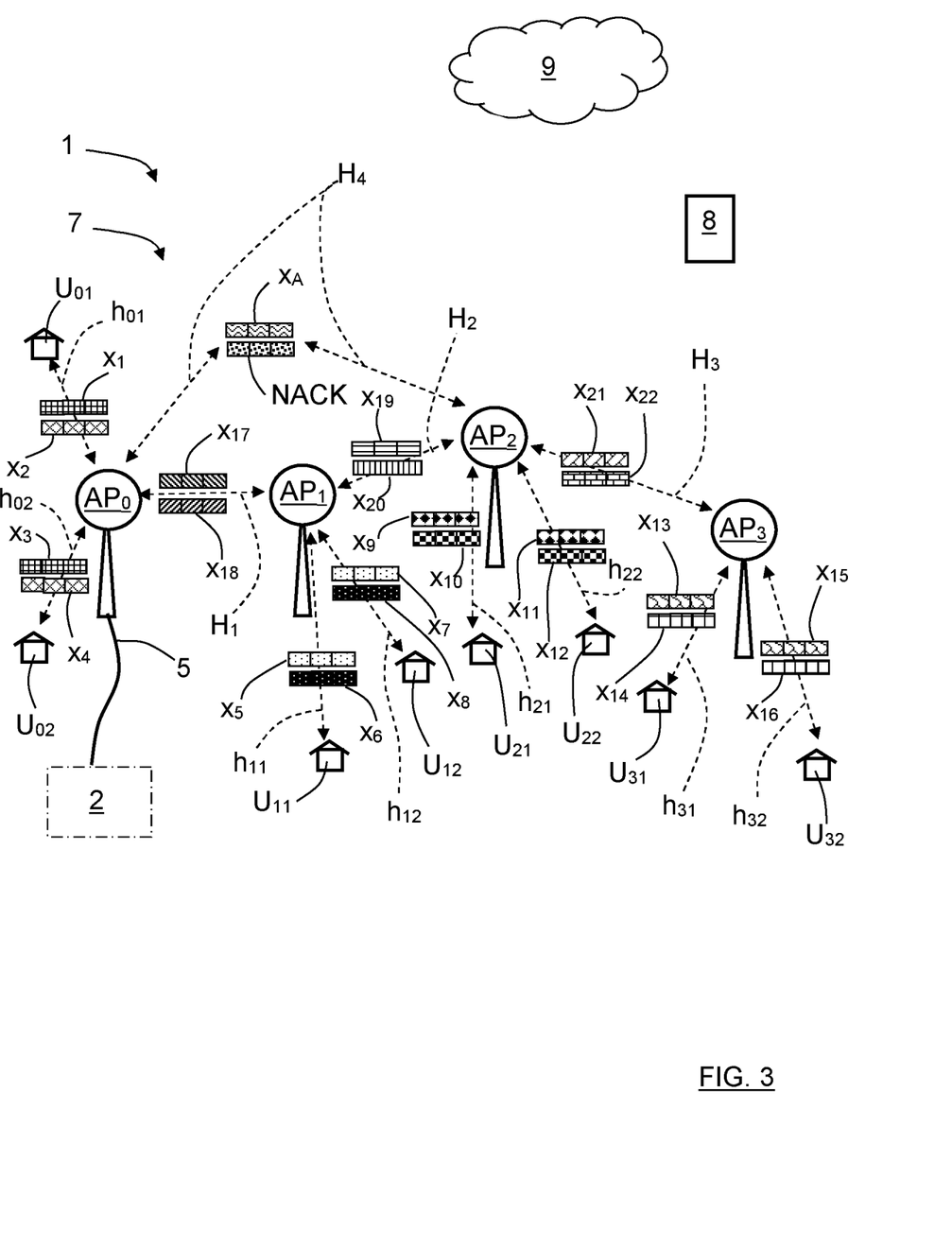
FIG. 3 schematically shows a view of a wireless communication system according to the first example at a following time slot.
Figure 4:
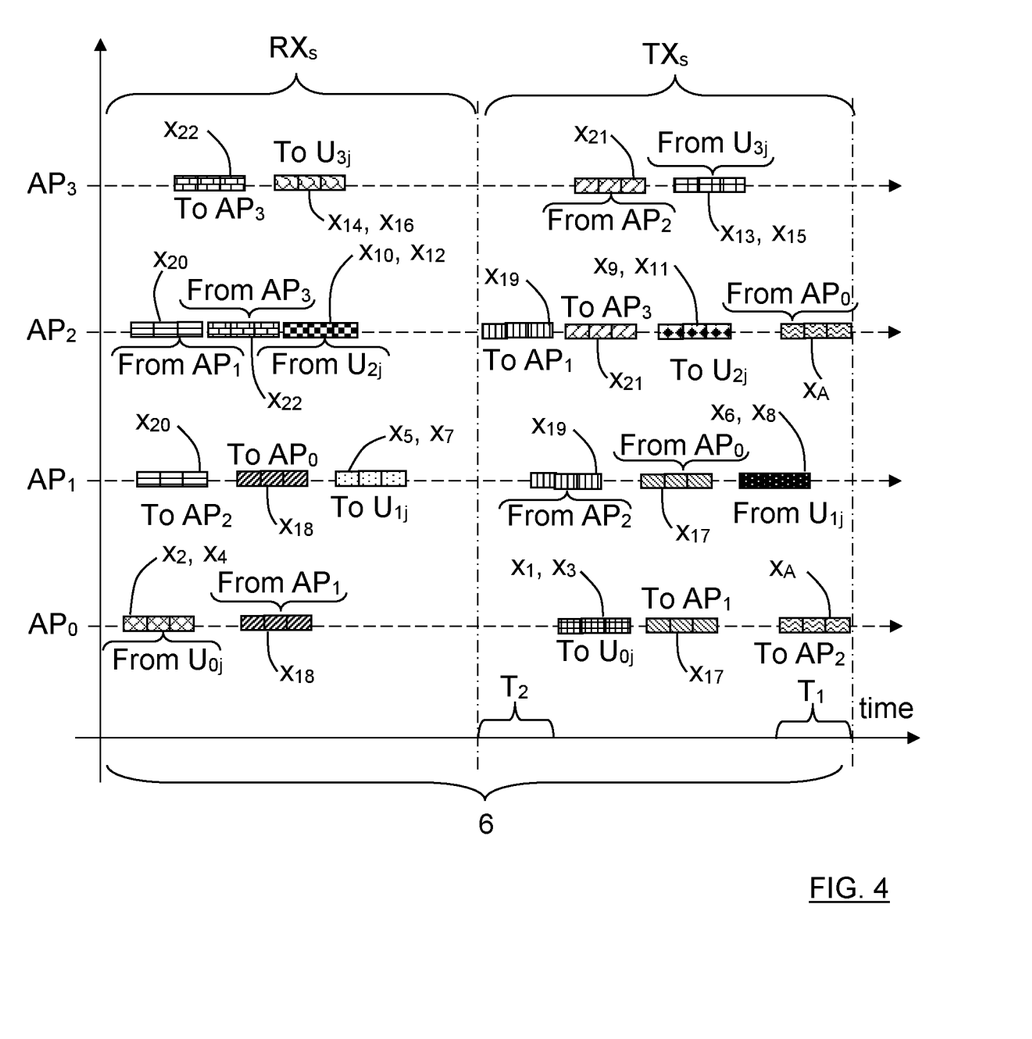
FIG. 4 schematically shows a timing diagram for the wireless communication system in FIG. 3.

A first example is illustrated in FIG. 1, FIG. 2, FIG. 3 and FIG. 4. In FIG. 1 and FIG. 2 only one signal is shown for reasons of clarity, while all signals during a time slot 6 are shown in FIG. 3 and FIG. 4, where FIG. 4 shows a timing diagram that corresponds to FIG. 3.

In FIG. 1, a first signal $x_A$ is transmitted from the first access point $AP_0$ to the second access point $AP_1$. In FIG. 2, the first signal $x_A$ is transmitted from the second access point $AP_1$ to the third access point $AP_2$. The third access point $AP_2$ is, however, unable to successfully decode the first signal $x_A$.

According to the present disclosure, with reference to FIG. 3 and FIG. 4, for example during a receive sub-slot $RX_s$, the third access point $AP_2$ is adapted to send a request for re-transmission, NACK, of the first signal $x_A$ directly to the first access point $AP_0$ via a direct backhaul channel $H_4$ between the first access point $AP_0$ and the third access point $AP_2$. According to some aspects, the request for re-transmission, NACK, of the first signal $x_A$ is based on HARQ. NACK can be sent in different ways, even in a totally different frequency.

This means that the third access point $AP_2$ does not request re-transmission from the second access point $AP_1$, which will alleviate the working of the second access point $AP_1$ which normally is heavily loaded.

During a following transmit sub-slot $TX_s$, the first access point $AP_0$ is adapted to re-transmit the first signal $x_A$ directly to the third access point $AP_2$ via the direct backhaul channel $H_4$, and the third access point $AP_2$ is adapted to receive the re-transmitted first signal $x_A$ directly from the first access point $AP_0$ via the direct backhaul channel $H_4$.

In this context, for the third access point $AP_2$, the second access point $AP_1$ is an adjacent first type node, and the first access point $AP_0$ is a farther first type node.

This means that after having transmitted the first signal $x_A$ to the third access point $AP_2$, the second access point $AP_1$ is no longer involved in the further handling of the first signal $x_A$, which reduces the burden of the third access point $AP_2$. According to some aspects the first signal $x_A$ is deleted from the buffer memory of the second access point $AP_1$ after the transmission of the first signal $x_A$. The first signal $x_A$ is, however, retained in the buffer memory of the first access point $AP_0$.

When the first signal $x_A$ has been successfully decoded by the third access point $AP_2$, it is forwarded to either the CPE:s $U_{21}$, $U_{22}$ that are served by the third access point $AP_2$, or to the fourth access point $AP_3$, depending on the final destination for the first signal $x_4$.

According to some aspects, the following re-transmission of the first signal $x_4$ is performed in time periods $T_1$ where the third access point $AP_2$ and the first access point $AP_0$ are not engaged in any communication with other nodes. This will be described in the following with reference to FIG. 3 and FIG. 4.

In the receive sub-slot $RX_s$, the first access point $AP_0$ is receiving information $x_2$, $x_4$ from its served CPE:s $U_{01}$, $U_{02}$, and information $x_{18}$ from the second access point $AP_1$. The second access point $AP_1$ transmits information $x_{20}$ to the third access point $AP_2$, the information $x_{18}$ to the first access point $AP_0$ and information $x_5$, $x_7$ to its served CPE:s $U_{11}$, $U_{12}$. The third access point $AP_2$ receives the information $x_{20}$ from the second access point $AP_1$, information $x_{22}$ from the fourth access point $AP_3$ and information $x_{10}$, $x_{12}$ from its served CPE:s $U_{21}$, $U_{22}$. The fourth access point $AP_3$ transmits the information $x_{22}$ to the third access point $AP_2$, and information $x_{14}$, $x_{16}$ to its served CPE:s $U_{31}$, $U_{32}$.

In the transmit sub-slot $TX_s$, the first access point $AP_0$ is transmitting information $x_1$, $x_3$ to its served CPE:s $U_{01}$, $U_{02}$, and information $x_{17}$ to the second access point $AP_1$. The second access point $AP_1$ receives information $x_{19}$ from the third access point $AP_2$, the information $x_{17}$ from the first access point $AP_0$ and information $x_6$, $x_8$ from its served CPE:s $U_1$, $U_{12}$. The third access point $AP_2$ transmits the information $x_{19}$ to the second access point $AP_1$, information $x_{21}$ to the fourth access point $AP_3$ and information $x_9$, $x_{11}$ to its served CPE:s $U_{21}$, $U_{22}$. The fourth access point $AP_3$ receives the information $x_{21}$ from the third access point $AP_2$, and information $x_{13}$, $x_{15}$ from its served CPE:s $U_{31}$, $U_{32}$.

Furthermore, in accordance with the present disclosure, the first access point $AP_0$ can take advantage of a first time period $T_1$ in the transmit sub-slot $TX_s$, when the first access point $AP_0$ and the third access point $AP_2$ are temporarily inactive, to re-transmit the first signal $x_4$ to the third access point $AP_2$. The re-transmission takes place via the direct backhaul channel $H_4$ between the first access point $AP_0$ and the third access point $AP_2$.

Temporarily inactive time periods $T_1$ of different hops can thus be used to reduce network end-to-end transmission delay as well as buffer requirement.

The present disclosure will now be discussed more in detail for the present example.

By means of the present disclosure, to reduce the buffer requirement of the second access point $AP_1$ and reduce the scheduling delay, the second access point $AP_1$ is only responsible for the initial transmission of the first signal $x_4$ to the third access point $AP_2$. Then, immediately after initial transmission, the second access point $AP_1$ drops the first signal $x_4$ and does not wait for the acknowledgement/negative acknowledgement (ACK/NACK) from the third access point $AP_2$. That is, in terms of HARQ-based retransmissions, the second access point $AP_1$ is only responsible for the retransmissions to its own CPEs, i.e., $U_{1j}$, j=1, . . . , m and not for the signals of the third access point $AP_2$ or the fourth access point $AP_3$.

Receiving the initial first signal $x_4$ from the second access point $AP_1$, the third access point $AP_2$, tries to decode the received first signal $x_4$. If the first signal $x_4$ is correctly decoded, the third access point $AP_2$ sends an ACK to the first access point $AP_0$, and then the first access point $AP_0$ drops the associated buffered first signal $x_4$. Otherwise, the third access point $AP_2$ sends an NACK to the first access point $AP_0$. Then, the HARQ-based retransmission starts where the first access point $AP_0$ uses temporarily inactive time periods, e.g., the time period $T_1$ in FIG. 4, to retransmit the signal directly to the third access point $AP_2$. The retransmissions continues until the signal is correctly decoded or a maximum number of retransmissions, suitably considered by the network designer, is reached. Note that the second access point $AP_1$ is completely bypassed during the retransmission rounds and the first access point $AP_0$ connects to the third access point $AP_2$ directly.

When and how to send the ACK/NACK to the first access point $AP_0$ can differ. In this example, once second access point $AP_1$ has transmitted the initial first signal $x_4$, it is removed from its buffer and the second access point $AP_1$ does not care anymore if the third access point $AP_2$ can decode first signal $x_4$ or not. Then, for possible retransmissions, the third access point $AP_2$ communicates directly with the first access point $AP_0$, both for retransmissions and ACK/NACK feedbacks via the direct backhaul channel $H_4$. Preferably the retransmission of signal from $AP_0$ to $AP_2$ are according to some aspects performed in temporarily inactive time periods $T_1$ because they often are costly and relatively long signals. The ACK/NACK is normally relatively short and not costly and can be transmitted in the same or a different frequency band.

When sending the first signal $x_4$ to the third access point $AP_2$ via the second access point $AP_1$, the first access point $AP_0$ buffers the first signal $x_4$. Then, the first access point $AP_0$ waits for ACK/NACK feedbacks from the third access point $AP_2$, and if the third access point $AP_2$ fails to decode the first signal $x_4$ from the initial data transmission of the second access point $AP_1$, the first access point $AP_0$ will take care of the retransmissions to the third access point $AP_2$ in the temporarily inactive time periods. Compared to data transmission in the $AP_0$-$AP_1$ link, the first access point $AP_0$ may adapt the transmission power/rate and use a different beamforming scheme when retransmitting the failed first signal $x_4$ directly to the third access point $AP_2$ in the temporarily inactive time periods. Also, the timings are adapted depending on if the second access point $AP_1$ or the third access point $AP_2$ are receiving signals from the first access point $AP_0$.

The AP-AP links are stationary and the second access point $AP_1$ can determine the appropriate transmission rate/power with high accuracy such that the third access point $AP_2$ can decode a received signal correctly with high probability. Therefore, the retransmission may be required rarely. Thus, considering the high load of the second access point $AP_1$, it is mostly not necessary that the second access point $AP_1$ buffers all signals to the third access point $AP_2$ for the rare cases of requiring retransmissions. On the other hand, due to accurate parameter adaptation, if the third access point $AP_2$ fails to decode a received signal, a successfully decoded signal is normally almost obtained and the third access point $AP_2$ only needs a small boost to decode the failed signal. This small boost can be well provided by the first access point $AP_0$ via the direct backhaul channel $H_4$ even if the link via the direct backhaul channel $H_4$ may be weak.

Figure 10:
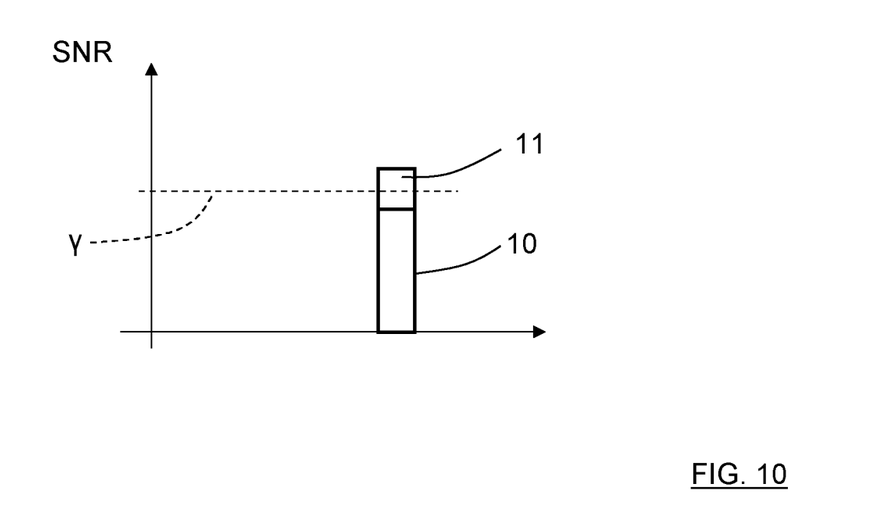
FIG. 10 schematically shows a graphical representation of accumulated SNR.

This is illustrated in FIG. 10, where it is shown that a large part of the SNR required by the third access point $AP_2$ for successful message decoding is provided by the initial transmission of the first signal $x_4$ from the second access point $AP_1$. The third access point $AP_2$ fails to decode the first signal $x_4$ in a first transmission 10, since the SNR falls below a threshold y for successful decoding. A re-transmission 11 results in that the SNR exceeds the threshold v for successful decoding. Since the first signal $x_4$ in the first transmission 10 is relatively close to the threshold γ for successful decoding, in the re-transmission only a relatively small boost of the SNR is needed to exceed the threshold γ for successful decoding.

In this way, the load and buffer requirement of the second access point $AP_1$ is reduced, and consequently the scheduling delay is reduced as well because part of the data is transferred without using the second access point $AP_1$.

Re-transmission, for example using HARQ, is performed without any system cost in terms of spectrum and scheduling delay where spectrum utilization is improved by using the temporarily inactive time periods $T_1$. Performing the initial transmission via the second backhaul channel $H_2$ and retransmissions via the direct backhaul channel $H_4$ increases the network diversity and, consequently, reduces the probability of requiring multiple HARQ-based retransmission rounds.

Moreover, the spectrum utilization is improved by using the temporarily inactive time periods $T_1$, which leads to lower end-to-end transmission delay and higher throughput for the CPE:s $U_{21}$, $U_{22}$; $U_{31}$, $U_{32}$ that are served by the third access point $AP_2$ and the fourth access point $AP_3$.

According to some aspects, the third access point $AP_2$ sends an ACK/NACK, in dependence of if the decoding has been successful or not, to the to the first access point $AP_0$ via the first access point $AP_1$, via the second backhaul channel $H_2$ and the first backhaul channel $H_1$, not via the direct backhaul channel $H_4$. The re-transmitted signal $x_A$ is always transmitted via the direct backhaul channel $H_4$. This is a possible aspect, since the ACK/NACK signal contains relatively little information and contributes relatively little to the load of an AP compared to a normal data message. This can be applicable for all examples and other possible signal routes.

Figure 5:
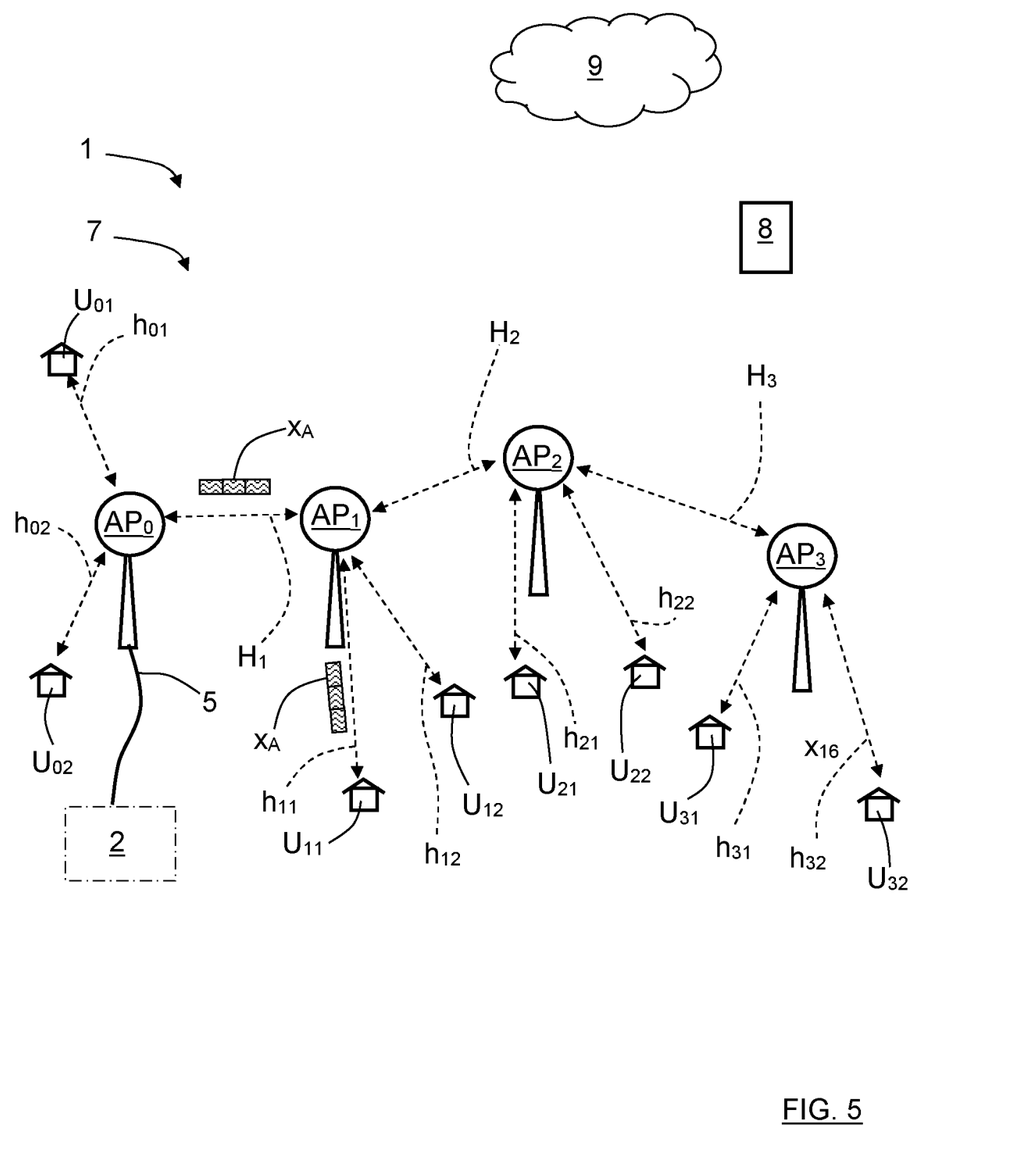
FIG. 5 schematically shows a view of a wireless communication system according to a first example at a first time.
Figure 6:
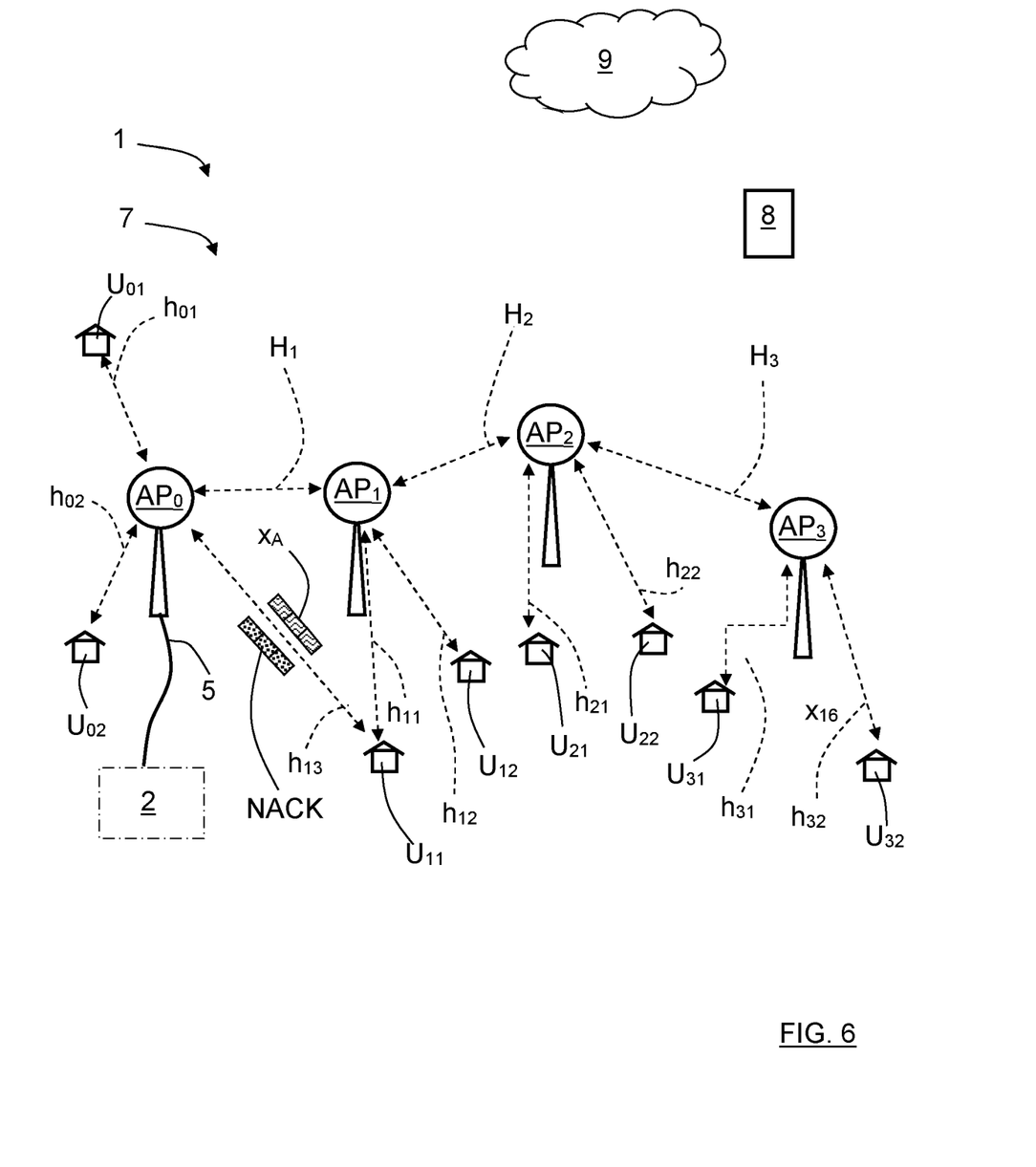
FIG. 6 schematically shows a view of a wireless communication system according to the first example at a second time.

With reference to FIG. 5 and FIG. 6, a second example is provided. Here, only one signal is shown for reasons of clarity.

In FIG. 5, two instances in time are shown. First, a first signal $x_A$ is transmitted from the first access point $AP_0$ to second access point $AP_1$, and then from the second access point $AP_1$ to a first CPE $U_{11}$ that is served by the second access point $AP_1$. The first CPE $U_{11}$ is, however, unable to successfully decode the first signal $x_A$.

According to the present disclosure, with reference to FIG. 6, the first CPE $U_{11}$ is adapted to send a request for re-transmission, NACK, of the first signal $x_A$ directly to the first access point $AP_0$ via a direct access channel $h_{13}$ between the first access point $AP_0$ and first CPE $U_{11}$. According to some aspects, the request for re-transmission, NACK, of the signal $x_A$ is based on HARQ.

This means that the first CPE $U_{11}$ does not request re-transmission from the second access point $AP_1$, which will alleviate the working of the second access point $AP_1$ which normally is heavily loaded.

The first access point $AP_0$ is adapted to re-transmit the first signal $x_A$ directly to the first CPE $U_{11}$ via the direct access channel $h_{13}$, and the first CPE $U_{11}$ is adapted to receive the re-transmitted first signal $x_A$ directly from the first access point $AP_0$ via the direct access channel $h_{13}$.

In this context, for the first CPE $U_{11}$, the second access point $AP_1$ is an adjacent first type node, and the first access point $AP_0$ is a farther first type node.

The present disclosure can thus be implemented for both backhaul communication and access communication.

By means of the present disclosure, scheduling and end-to-end data transmission delays are reduced, network diversity is increased, buffer requirement of the AP nodes is reduced, and different AP nodes of the network will have an equalized load which leads to better balance of the load in different AP nodes. Particularly, the load/buffer requirement of the most loaded AP nodes, in the examples above the second application point $AP_1$, is reduced and spectrum utilization of low-loaded nodes as well as the network diversity are increased, such that spectrum underutilization of low-loaded nodes is avoided.

The temporarily inactive time periods of the AP nodes with low spectrum utilization are used for HARQ-based retransmissions, in case the data transmission in the heavily-loaded links fails, which increases the network diversity and reduces the probability of requiring multiple HARQ-based retransmissions. As a further result, the heavily-loaded nodes are not responsible for HARQ-based retransmissions, and can drop the message from their buffer after the first transmission. Also, depending on the data transmission method in different time slots, the timing, the beamforming and the buffering methods of the IAB nodes are updated. In this way, this leads to improved end-to-end throughput of the CPE:s, better energy efficiency, and decreased buffer requirement for the AP nodes.

As a result of this, the number of hops and/or the number of CPE:s per hop can be increased.

Figure 7:
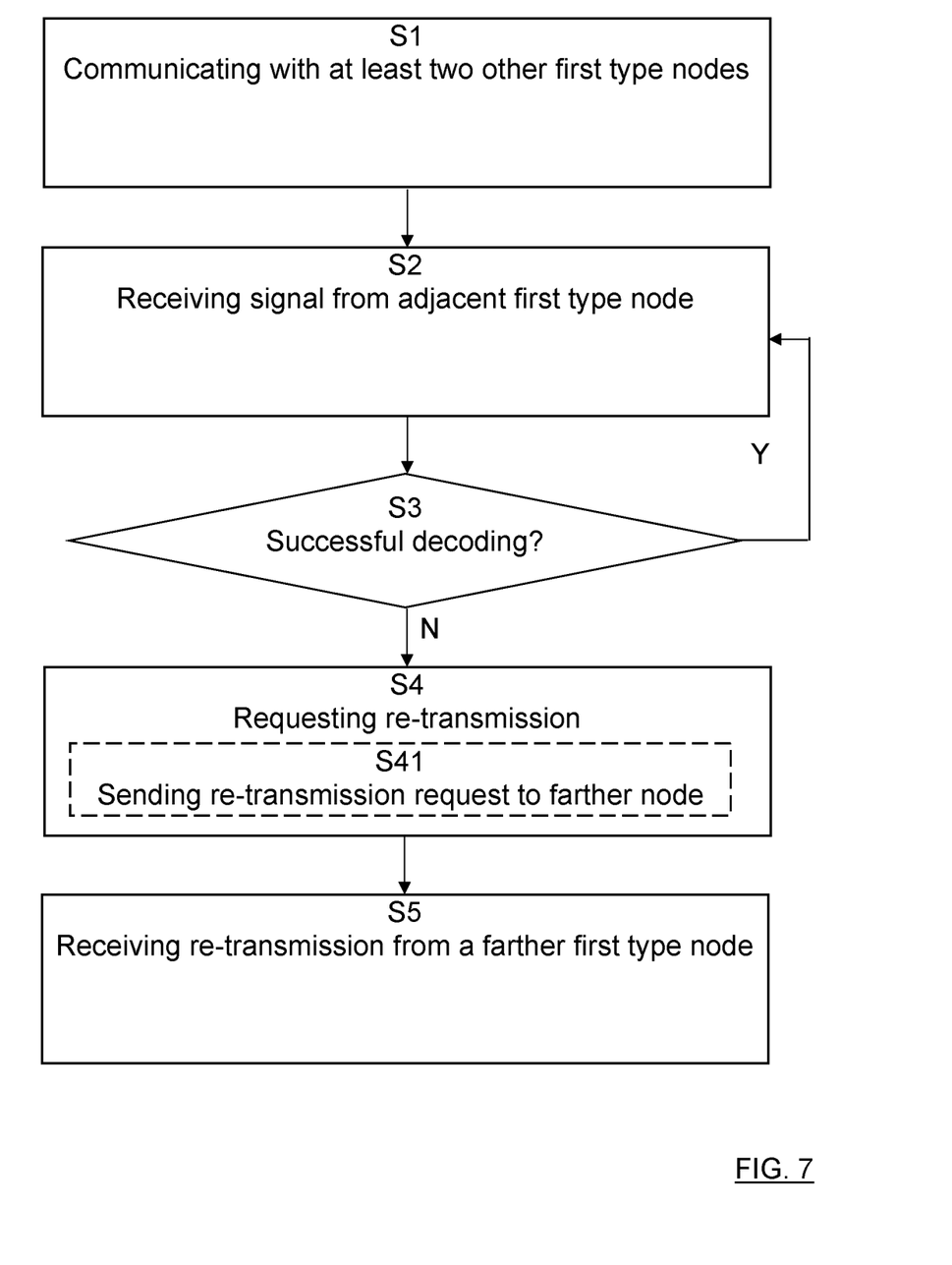
FIG. 7 shows a flowchart of methods according to embodiments.

With reference to FIG. 7, the present disclosure also relates to a method in a node $AP_2$, $U_{11}$ in a wireless communication system 1, wherein the method comprises communicating S1 with at least two other nodes $AP_1$, $AP_0$ in the wireless communication system 1, where the other nodes $AP_1$, $AP_0$ are of a first type and constitute first type nodes $AP_1$, $AP_0$ that use backhaul communication when communicating with each other. The method further comprises receiving S2 a signal $x_A$ transmitted from an adjacent first type node $AP_1$, where the signal $x_A$ has been forwarded from at least one farther first type node $AP_0$. In case of unsuccessful decoding S3 of the signal $x_A$, the method comprises requesting S4 re-transmission NACK of the signal $x_A$ and receiving S5 re-transmission of the signal $x_A$ directly from a farther first type node $AP_0$.

According to some aspects, the method comprises sending S41 a request for re-transmission NACK of the signal $x_A$ directly to a farther first type node $AP_0$.

According to some aspects, the node is a first type node $AP_2$ that is used for communication with the adjacent first type node $AP_1$ over a corresponding backhaul channel $H_1$, and for communication with said farther first type node $AP_0$ via a via a direct backhaul channel $H_4$.

According to some aspects, the farther first type node is a first type node $AP_0$ that is connected to a core network 2 by means of a fiber connection 5.

According to some aspects, the node is a second type node $U_{11}$ that is used for communication with the adjacent first type node $AP_1$ over a corresponding access channel $h_{11}$, and for communication with said farther first type node $AP_0$ via a via a direct access channel $h_{13}$.

According to some aspects, the communication between the first type nodes $AP_0$, $AP_1$, $AP_2$, $AP_3$ is a backhaul communication via at least one corresponding backhaul channel $H_1$, $H_2$, $H_3$, $H_4$, and where at least one first type node $AP_0$, $AP_1$, $AP_2$, $AP_3$ is used for communication with a corresponding group of second type nodes $U_{11}$, $U_{12}$; $U_{21}$, $U_{22}$; $U_{31}$, $U_{32}$ via a corresponding access channel $h_{11}$, $h_{12}$; $h_{21}$, $h_{22}$; $h_{31}$, $h_{32}$. Each group of second type nodes $U_{11}$, $U_{12}$; $U_{21}$, $U_{22}$; $U_{31}$, $U_{32}$ comprises at least one second type node $U_{11}$, $U_{12}$; $U_{21}$, $U_{22}$; $U_{31}$, $U_{32}$, where the backhaul communication and the access communication both are performed by means of common equipment at each one of the first type nodes $AP_0$, $AP_1$, $AP_2$, $AP_3$.

According to some aspects, the method comprises re-transmission of the signal $x_A$ in temporarily inactive time periods $T_1$ where the node $AP_2$ and the farther node $AP_0$ are not used for communication with other nodes.

According to some aspects, the request for re-transmission NACK of the signal $x_A$ is based on Hybrid Automatic Repeat Request (HARQ).

Figure 8:
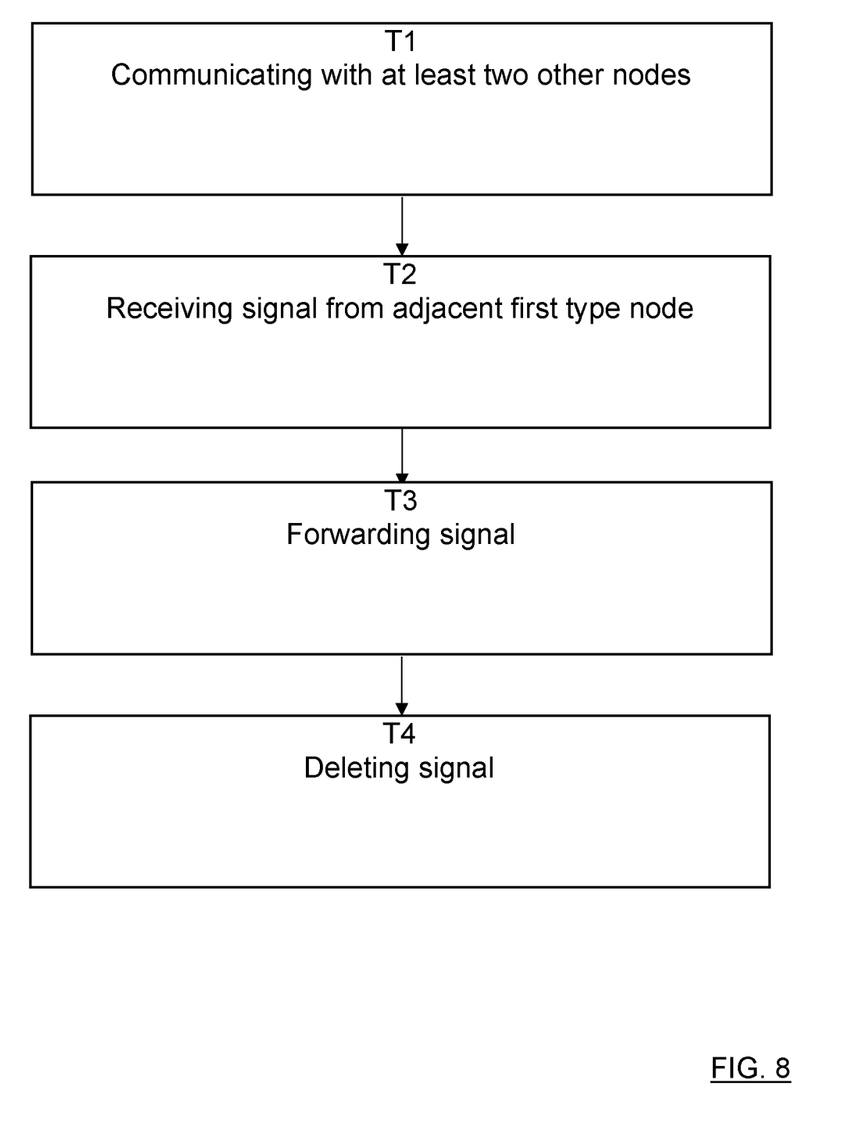
FIG. 8 shows a flowchart of methods according to embodiments.

With reference to FIG. 8, the present disclosure also relates to a method in a first type node $AP_1$ in a wireless communication system 1, wherein the method comprises communicating T1 with at least two other nodes $AP_2$, $U_{11}$, $AP_0$ in the wireless communication system 1, where at least one of the other nodes $AP_2$, $AP_0$ is a first type node that uses backhaul communication when communicating with other first type nodes, and receiving T2 a signal $x_A$ transmitted from an adjacent first type node $AP_0$. The method further comprises forwarding T3 the signal $x_A$ to a receiving node $AP_2$, $U_{11}$, and deleting T4 the forwarded signal $x_A$ from its buffer after having forwarded the signal $x_A$, irrespective of if the receiving node $AP_2$, $U_{11}$ is able to decode the signal $x_A$ or not.

According to some aspects, the adjacent first type node $AP_0$ is connected to a core network 2 by means of a fiber connection 5.

Figure 9A:
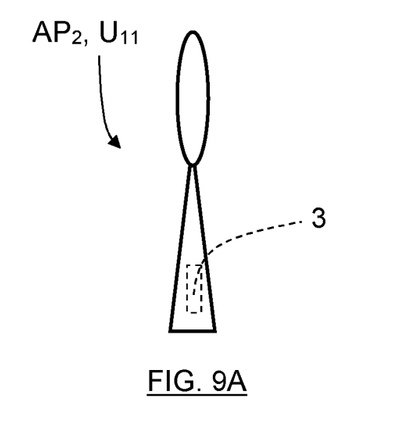
FIG. 9A schematically shows a first type node.

As shown in FIG. 9A, according to some aspects, a node $AP_2$, $U_{11}$, in a wireless communication system 1 comprises a processor unit 3 that is adapted to control communication with at least two other first type nodes $AP_1$, $AP_0$ in the wireless communication system 1. The processor unit 3 is further adapted to control reception of a signal $x_A$ transmitted from an adjacent first type node $AP_1$, where the signal $x_A$ has been forwarded from at least one farther first type node $AP_0$. In case of unsuccessful decoding of the signal $x_A$, the processor unit 3 is further adapted to request re-transmission (NACK) of the signal $x_A$; and to control reception of a re-transmission of the signal $x_A$ directly from a farther first type node $AP_0$.

According to some aspects, the processor unit 3 is adapted to control a sending of a request for re-transmission (NACK) of the signal $x_A$ directly to a farther first type node $AP_0$.

According to some aspects, the node is a first type node $AP_2$ that is adapted to communicate with the adjacent first type node $AP_1$ over a corresponding backhaul channel $H_1$, and to communicate with said farther first type node $AP_0$ via a via a direct backhaul channel $H_4$.

According to some aspects, the farther first type node is a first type node $AP_0$ that is connected to a core network 2 by means of a fiber connection 5.

According to some aspects, the node is a second type node $U_{11}$ that is adapted to communicate with the adjacent first type node $AP_1$ over a corresponding access channel $h_{11}$, and to communicate with said farther first type node $AP_0$ via a via a direct access channel $h_{13}$.

Figure 9B:
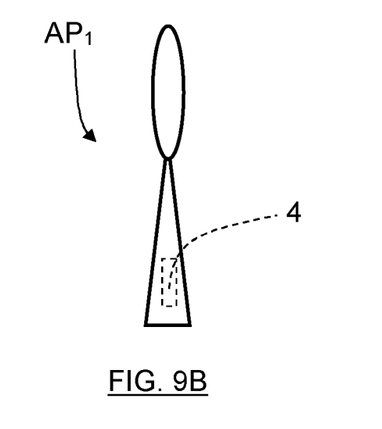
FIG. 9B schematically shows a first type node.

As shown in FIG. 9B, according to some aspects, a first type node $AP_1$ in a wireless communication system 1 comprises a processor unit 4 that is adapted to control communication with at least two other first type nodes $AP_2$, $U_{11}$, $AP_0$ in the wireless communication system, where at least one of the other nodes $AP_2$, $AP_0$ is a first type node that is adapted to communicate with other first type nodes by means of backhaul communication. The processor unit 4 is further adapted to control reception of a signal $x_A$ transmitted from an adjacent first type node $AP_0$, and to forward the signal $x_A$ to a receiving node $AP_2$, $U_{11}$. The processor unit 3 is further adapted to delete the forwarded signal $x_A$ from a buffer memory after transmission of the signal $x_A$, irrespective of if the receiving node is able to decode the signal $x_A$ or not.

According to some aspects, the adjacent first type node is a first type node $AP_0$ that is connected to a core network 2 by means of a fiber connection 5.

The present disclosure also relates to a wireless communication system 1 comprising an integrated access and backhaul, IAB, network 7 which in turn comprises the nodes $AP_2$, $U_{11}$; $AP_1$ discussed above with reference to FIG. 9A and FIG. 9B.

The present disclosure is not limited to the above, but may vary freely within the scope of the appended claims. For example, in the examples discussed above, the first access point $AP_0$ connects to the third access point $AP_2$ directly to provide it with the signals of the served CPE:s $U_{21}$, $U_{22}$; $U_{31}$, $U_{32}$ of both the third access point $AP_2$ and the fourth access point $AP_3$. However, according to some aspects, the first access point $AP_0$ is adapted to directly receive a NACK for a certain signal from any access point that is not closest to the first access point $AP_0$, for example directly from the fourth access point $AP_3$. The first access point $AP_0$ is then adapted to directly re-transmit said certain signal to any access point that is not closest to the first access point $AP_0$, for example directly to the fourth access point $AP_3$ in a second time period $T_2$ where the first access point $AP_0$ and the fourth access point $AP_3$ are temporarily inactive.

In the examples discussed above, a time slot 6 is divided into sub-slots $RX_s$, $TX_s$, each one having access and backhaul connections. In another approach, a time slot is divided into access and backhaul sub-slots where each one has DL and UL transmission. Generally, the present disclosure is applicable for different schemes of time allocation.

According to some aspects, the efficiency of the present disclosure depends on the amount of interference added to the access links between the second access point $AP_1$ and its served CPE:s $U_{11}$, $U_{12}$ by means of the direct transmission from, for example, the first access point $AP_0$ to the third access point $AP_2$. However, because the AP:s normally are equipped with many antennas and advanced beamforming methods, and also because the direct communication via the direct channel $H_4$ does not need to have high rate and, consequently, possibly relatively low transmission power, the interference to the access links between the second access point $AP_1$ and its served CPE:s $U_{11}$, $U_{12}$ will be negligible. This is especially because an IAB network normally is used for stationary networks where the channel measurements and parameter settings can be done before the data transmission.

According to some aspects, examples of important parts of the present disclosure are:

1) As discussed previously, present disclosure is applicable for setting up a direct channel between two nodes such that one node is bypassed and relieved. For example, the fourth access point $AP_3$ can communicate directly with the first access point $AP_0$ via a corresponding direct backhaul channel.
2) In the examples described, a time slot is divided into RX/TX sub-slots $RX_s$, $TX_s$, each one having access and backhaul connections. In another approach, the time slot is divided into access and backhaul sub-slots each one having DL and UL transmission. The present disclosure is applicable for different schemes of time allocation.
3) The efficiency of the proposed method depends on if a fairly good direct backhaul channel $H_4$ can be found.

However, because a large part of the minimum SNR required for successfully decoding has been provided by the initial transmission of the signal $x_A$ as shown in FIG. 10, lower data rates can be used for the direct backhaul channel $H_4$ without affecting end-to-end data transmission delay.

According to some aspects, the present disclosure can easily extended to the cases with arbitrary number of hops, different relaying approaches or star-like network configuration.

According to some aspects, in the present context, the term signal corresponds to a data signal or a data message. According to some aspects, in the present context, the terms relay and relaying correspond to the terms forward and forwarding.

According to some aspects, the node $AP_2$, $U_{11}$ that sends a request for re-transmission, NACK, of the signal $x_A$, can either send directly to the first access point $AP_0$, or to the second access point $AP_1$ that forwards the NACK to the first access point $AP_0$.

The present disclosure has been described for an uncomplicated case with relatively few hops, although the present disclosure can be applied to the cases with arbitrary number of hops and CPE:s.

In the examples, the third access point $AP_2$ has been adapted to communicate directly with the first access point $AP_0$ via the direct backhaul channel $H_4$, but not the fourth access point $AP_3$ that has to depend on relaying via the third access point $AP_2$ for both uplink and downlink. According to some aspects, the fourth access point $AP_3$ and possibly one or more other (not shown) access points can also be adapted to communicate directly with the first access point $AP_0$, or other suitable access points, via corresponding direct backhaul channels.

According to some aspects, the wireless communication system 1 can be any suitable communication system that comprises any suitable wireless network. According to some aspects, the wireless communication system 1 comprises one or more IAB networks 7.

The present disclosure is applicable for both uplink (UL) and downlink (DL) transmissions as well as for different types of HARQ.

Generally, the present disclosure relates to a node $AP_2$, $U_{11}$ in a wireless communication system 1, wherein the node $AP_2$, $U_{11}$ is adapted to communicate with at least two other nodes $AP_1$, $AP_0$ in the wireless communication system 1, where the other nodes $AP_1$, $AP_0$ are first type nodes $AP_1$, $AP_0$ which are adapted to communicate with each other by means of backhaul communication. The node $AP_2$, $U_{11}$ is further adapted to receive a signal $x_A$ transmitted from an adjacent first type node $AP_1$, where the signal $x_A$ has been forwarded from at least one farther first type node $AP_0$. In case of unsuccessful decoding of the signal $x_A$, the node $AP_2$, $U_{11}$ is adapted to request re-transmission (NACK) of the signal $x_A$, and to receive a re-transmission of the signal $x_A$ directly from a farther first type node $AP_0$.

According to some aspects, the node $AP_2$, $U_{11}$ is adapted to send a request for re-transmission NACK of the signal $x_A$ directly to a farther first type node $AP_0$.

According to some aspects, the node is a first type node $AP_2$ that is adapted to communicate with the adjacent first type node $AP_1$ over a corresponding backhaul channel $H_1$, and to communicate with said farther first type node $AP_0$ via a direct backhaul channel $H_4$.

According to some aspects, the farther first type node is a first type node $AP_0$ that is connected to a core network 2 by means of a fiber connection 5.

According to some aspects, the node is a second type node $U_{11}$ that is adapted to communicate with the adjacent first type node $AP_1$ over a corresponding access channel $h_{11}$, and to communicate with said farther first type node $AP_0$ via a via a direct access channel $h_{13}$.

According to some aspects, the communication between the first type nodes $AP_0$, $AP_1$, $AP_2$, $AP_3$ is a backhaul communication via at least one corresponding backhaul channel $H_1$, $H_2$, $H_3$, $H_4$, and where at least one first type node $AP_0$, $AP_1$, $AP_2$, $AP_3$ is adapted to communicate with a corresponding group of second type nodes $U_{11}$, $U_{12}$; $U_{21}$, $U_{22}$; $U_{31}$, $U_{32}$ via a corresponding access channel $h_{11}$, $h_{12}$; $h_{21}$, $h_{22}$; $h_{31}$, $h_{32}$, each group of second type nodes $U_{11}$, $U_{12}$; $U_{21}$, $U_{22}$; $U_{31}$, $U_{32}$ comprising at least one second type node $U_{11}$, $U_{12}$; $U_{21}$, $U_{22}$; $U_{31}$, $U_{32}$, where the backhaul communication and the access communication both are performed by means of common equipment at each one of the first type nodes $AP_0$, $AP_1$, $AP_2$, $AP_3$.

According to some aspects, a re-transmission of the signal $x_A$ are issued in temporarily inactive time periods $T_1$ where the node $AP_2$ and the farther node $AP_0$ are not engaged in any communication with other nodes.

According to some aspects, the request for re-transmission (NACK) of the signal $x_A$ is based on Hybrid Automatic Repeat Request (HARQ).

Generally, the present disclosure also relates to first type node $AP_1$ in a wireless communication system 1, where the first type node $AP_1$ is adapted to communicate with at least two other nodes $AP_2$, $U_{11}$, $AP_0$ in the wireless communication system 1, where at least one of the other nodes $AP_2$, $AP_0$ is a first type node that is adapted to communicate with other first type nodes by means of backhaul communication. The first type node $AP_1$ is adapted to receive a signal $x_A$ transmitted from an adjacent first type node $AP_0$, and to forward the signal $x_A$ to a receiving node $AP_2$, $U_{11}$. The first type node $AP_1$ is adapted to delete the forwarded signal $x_A$ from its buffer after having forwarded the signal $x_A$, irrespective of if the receiving node is able to decode the signal $x_A$ or not.

According to some aspects, the adjacent first type node $AP_0$ is connected to a core network 2 by means of a fiber connection 5.

Generally, the present disclosure also relates to wireless communication system 1 comprising an integrated access and backhaul, IAB, network 7 which in turn comprises at least the node $AP_2$, $U_{11}$ according to the above and the first type node $AP_1$ according to the above.

The invention claimed is:

1. A first node in a wireless communication system the first node being configured to:
  receive a signal transmitted from a second node via a first channel between the second node and a third node and a second channel between the third node and the first node, wherein
  the second node is configured to provide wireless access to a group of one or more devices,
  the third node is configured to provide wireless access to a group of one or more devices,
  the first channel is a backhaul channel, and
  in case of unsuccessful decoding of the signal at the first node, the first node is adapted to:
    request re-transmission of the signal; and
    based on requesting the re-transmission of the signal, receive the signal directly from the second node via a third channel between the second node and the first node, and wherein the first node is configured to:
provide wireless access to a group of one or more devices, the second channel between the third node and the first node is a backhaul channel, and the third channel between the second node and the first node is a backhaul channel;
receive another signal from the second node via the first channel between the second node and the third node and the second channel between the third node and the first node, forward to the received said another signal to a fourth node configured to provide wireless access to a group of devices via a fourth channel, and the fourth channel is a backhaul channel; and
determine that a signal-to-noise ratio (SNR) of the signal is less than a threshold value;
based on determining that the SNR of the signal is less than the threshold value, determine that the first node cannot decode the signal successfully;
determine that a combined SNR of the signal received via the first and second channels and the signal received via the third channel is greater than the threshold value; and
based on determining that the combined SNR of the signal is greater than the threshold value, determine that the first node can decode the signal successfully.

2. The first node according to claim 1, wherein the first node is adapted to request the re-transmission of the signal directly to the second node.

3. The first node according to claim 1, wherein the second node is connected to a core network by means of a fiber connection.

4. The first node according to claim 1, wherein the re-transmission of the signal is performed in temporarily inactive time periods where the first node and the second node are not engaged in any communication with other nodes.

5. The first node according to claim 1, wherein the request for the re-transmission of the signal is based on Hybrid Automatic Repeat Request, HARQ.

6. A method performed by a first node in a wireless communication system, the method comprising:
receiving a signal transmitted from a second node via a first channel between the second node and a third node and a second channel between the third node and the first node wherein;
the second node is configured to provide wireless access to a group of one or more devices,
the third node is configured to provide wireless access to a group of one or more devices,
the first channel is a backhaul channel, and
the method comprises, in case of unsuccessful decoding of the signal at the first node,
requesting re-transmission of the signal; and
based on requesting the re-transmission of the signal, receiving the re-transmission of the signal directly from the second node via a third channel between the second node and the first node,
wherein the first node is configured to provide wireless access to a group of one or more devices, the second channel between the third node and the first node is a backhaul channel, and the third channel between the second node and the first node is a backhaul channel;
receiving another signal from the second node via the first channel between the second node and the third node and the second channel between the third node and the first node;
forwarding to the received said another signal to a fourth node configured to provide wireless access to a group of devices via a fourth channel, and the fourth channel is a backhaul channel;
determining that a signal-to-noise ratio (SNR) of the signal is less than a threshold value;
based on determining that the SNR of the signal is less than the threshold value, determining that the first node cannot decode the signal successfully;
determining that a combined SNR of the signal received via the first and second channels and the signal received via the third channel is greater than the threshold value; and
based on determining that the combined SNR of the signal is greater than the threshold value, determining that the first node can decode the signal successfully.

7. The method according to claim 6, wherein the method comprises requesting the re-transmission of the signal directly to the second node.

8. The method according to claim 6, wherein the second node is connected to a core network by means of a fiber connection.

9. The method according to claim 6, wherein the re-transmission of the signal is performed in temporarily inactive time periods where the first node and the second node are not used for communication with other nodes.

10. The method according to claim 6, wherein the request for the re-transmission of the signal is based on Hybrid Automatic Repeat Request, HARQ.

11. A wireless communication system comprising:
a first access point for providing wireless access to a first group of one or more devices;
a second access point for providing wireless access to a second group of one or more devices;
a third access point for providing wireless access to a third group of one or more devices; and
a fourth access point for providing wireless access to a fourth group of one or more devices, wherein
the first access point is configured to transmit a first signal to the second access point via a first backhaul channel between the first and second access points,
the second access point is configured to receive the first signal from the first access point via the first backhaul channel and transmit the received first signal to the third access point via a second backhaul channel between the second and third access points,
the third access point is configured to receive the first signal from the second access point via the second backhaul channel and transmit the received first signal to the fourth access point via a third backhaul channel between the third and fourth access points,
the first access point is configured to retain a second signal in the first access point's buffer memory and transmit the second signal to the second access point via the first backhaul channel between the first and second access points,
the second access point is configured to receive the second signal from the first access point via the first backhaul channel, transmit the received first signal to the third access point via the second backhaul channel between the second and third access points, and delete the second signal from the second access point's buffer memory, and
the third access point is configured to:
receive the second signal from the second access point via the second backhaul channel between the second and third access points;

determine that a signal-to-noise ratio (SNR) of the second signal is less than a threshold value;
determine that the third access point cannot decode the second signal based on determining that the SNR of the second signal is less than the threshold value;
based on determining that the third access point cannot decode the second signal, transmit a request for re-transmission of the second signal to the first access point via a fourth backhaul channel between the first and third access points;
receive the second signal from the first access point via the fourth backhaul channel between the first and third access points;
determine that a combined SNR of the second signal received from the second access point and the second signal received from the first access point is greater than the threshold value; and
based on determinant that the combined SNR is greater than the threshold value, determine that the third access point can decode the second signal successfully.

* * * * *